US012774080B2

(12) United States Patent
Müller et al.

(10) Patent No.: US 12,774,080 B2
(45) Date of Patent: Oct. 27, 2026

(54) DOOR WITH LOCK ACTUATOR FOR INTEGRATION IN AN AIRCRAFT, CONTROL AND INFORMATION SYSTEM, COMPARTMENT FOR AN AIRCRAFT AND AIRCRAFT

(71) Applicants: Diehl Aviation Laupheim GmbH, Laupheim (DE); Diehl Aviation Gilching GmbH, Gilching (DE)

(72) Inventors: Björn Müller, Hamburg (DE); Florian Zager-Rode, Buxtehude (DE); Wolfgang Müller, Munich (DE)

(73) Assignees: Diehl Aviation Laupheim GmbH, Laupheim (DE); Diehl Aviation Gilching GmbH, Gilching (DE)

( * ) Notice: Subject to any disclaimer, the term of this patent is extended or adjusted under 35 U.S.C. 154(b) by 551 days.

(21) Appl. No.: 18/313,644

(22) Filed: May 8, 2023

(65) Prior Publication Data

US 2023/0272646 A1 Aug. 31, 2023

Related U.S. Application Data

(63) Continuation of application No. PCT/EP2021/077400, filed on Oct. 5, 2021.

(30) Foreign Application Priority Data

Nov. 12, 2020 (DE) ..................... 10 2020 129 818.8

(51) Int. Cl.

*B64C 1/14* (2006.01)
*E05B 47/00* (2006.01)

(Continued)

(52) U.S. Cl.

CPC .......... *B64C 1/1407* (2013.01); *E05B 63/244* (2013.01); *E05B 65/0085* (2013.01); *E05B 2047/0016* (2013.01); *E05B 2047/002* (2013.01)

(58) Field of Classification Search

CPC ............. E05B 65/0003; E05B 65/0085; E05B 65/0035; E05B 63/24; E05B 63/128;

(Continued)

(56) References Cited

U.S. PATENT DOCUMENTS 2,012,693 A * 8/1935 Rieback ................ E05B 63/242 70/120
2,254,702 A * 9/1941 Karavia .................. E05B 63/24 292/341.15

(Continued)

FOREIGN PATENT DOCUMENTS

AT 379202 B * 12/1985 ........... E05C 19/003
CN 106123460 A * 11/2016 ........... E05B 65/005

(Continued)

OTHER PUBLICATIONS

Computer Generated Translation for CN 106123460 A, Generated on Sep. 23, 2025, https://worldwide.espacenet.com/patent/ (Year: 2025).*

*Primary Examiner* — Alyson M Merlino
(74) *Attorney, Agent, or Firm* — Laurence A. Greenberg; Werner H. Stemer; Ralph E. Locher

(57) ABSTRACT

A door arrangement contains a door for a room with a door leaf, a wall portion of a wall structure laterally adjacent to the door, and a locking arrangement for the door. The locking arrangement includes a locking device in the door leaf with a blocking element, which can be moved in and contrary to a blocking direction in order to block or release the door, and a lock actuator in the wall portion with a first mechanical actuating element, which is unconnected to the (Continued)

blocking element in order to shift the blocking element, by mechanical contact pressure, from the movement position into the blocking position and vice versa. A control and information system contains the door arrangement, a control device for the lock actuator, a human/machine interface, and a communication interface for an authorized body different from the user.

18 Claims, 5 Drawing Sheets

(51) Int. Cl.
*E05B 63/24* (2006.01)
*E05B 65/00* (2006.01)

(58) Field of Classification Search
CPC .... E05B 63/244; E05B 63/248; E05B 63/242; E05B 47/0046; E05B 47/02; E05B 47/026; E05B 63/0052; E05C 7/04; E05C 7/045; E05C 7/06; B64D 45/0029
See application file for complete search history.

(56) References Cited

U.S. PATENT DOCUMENTS

| | | | | | |
|---|---|---|---|---|---|
| 2,672,745 | A * | 3/1954 | Marchetti | E05B 63/242 70/120 |
| 3,462,182 | A * | 8/1969 | Schacht | E05C 7/04 49/366 |
| 3,756,642 | A * | 9/1973 | Fulton | E05B 63/242 292/341.15 |
| 4,011,688 | A * | 3/1977 | Geiss | E05B 47/0012 49/276 |
| 4,271,691 | A * | 6/1981 | Logan | E05B 63/0069 70/DIG. 49 |
| 4,902,052 | A * | 2/1990 | Laine | E05B 63/248 292/144 |
| 4,994,722 | A | 2/1991 | Dolan et al. | |
| 5,375,374 | A * | 12/1994 | Rohraff, Sr. | E05F 15/63 49/340 |
| 5,933,086 | A * | 8/1999 | Tischendorf | E05B 47/068 340/5.64 |
| 6,580,355 | B1 * | 6/2003 | Milo | E05B 63/248 70/277 |
| 7,908,896 | B1 * | 3/2011 | Olson | E05B 47/068 70/432 |
| 9,187,938 | B2 * | 11/2015 | Pluta | E05B 63/248 |
| 9,975,647 | B2 * | 5/2018 | Fleck | B64D 45/0029 |
| 11,441,333 | B2 * | 9/2022 | Tagtow | E05B 47/026 |
| 12,252,926 | B2 * | 3/2025 | Müller | E05B 65/0035 |
| 2002/0092951 | A1 | 7/2002 | Haviv | |
| 2005/0224649 | A1 | 10/2005 | Tomiyama et al. | |
| 2009/0267358 | A1 | 10/2009 | Bourgain et al. | |
| 2014/0265360 | A1 | 9/2014 | Orhaim et al. | |
| 2020/0115029 | A1 | 4/2020 | Movsesian et al. | |
| 2020/0224462 | A1 | 7/2020 | Renner et al. | |

FOREIGN PATENT DOCUMENTS

| | | | | | |
|---|---|---|---|---|---|
| DE | 19727878 | A1 | | 1/1999 | |
| DE | 102018113132 | A1 | | 12/2019 | |
| EP | 0640735 | A1 | | 3/1995 | |
| GB | 191412983 | A | * | 9/1914 | E05B 47/026 |
| GB | 2267118 | A | * | 11/1993 | E05B 53/00 |
| GB | 2303166 | A | | 2/1997 | |
| JP | H04151399 | A | | 5/1992 | |

* cited by examiner

DOOR WITH LOCK ACTUATOR FOR INTEGRATION IN AN AIRCRAFT, CONTROL AND INFORMATION SYSTEM, COMPARTMENT FOR AN AIRCRAFT AND AIRCRAFT

CROSS-REFERENCE TO RELATED APPLICATION

This application is a continuation, under 35 U.S.C. § 120, of copending International Patent Application PCT/EP2021/077400, filed Oct. 5, 2021, which designated the United States; this application also claims the priority, under 35 U.S.C. § 119, of German Patent Application DE 10 2020 129 818.8, filed Nov. 12, 2020; the prior applications are herewith incorporated by reference in their entireties.

FIELD AND BACKGROUND OF THE INVENTION

The invention relates to a door for a compartment in an aircraft, wherein the door has a locking arrangement which allows the door to be moved or prevents the door from being moved.

Doors for compartments, such as, for example, washrooms in aircraft, are often intended to be opened, closed and locked manually. From the prior art, doors for washrooms in aircraft are also already known and can be opened and closed automatically and without any contact.

For example, the publication, non-prosecuted German patent application DE 10 2018 113 132 A1 describes an apparatus for actuating a door for toilet cubicles on-board aircraft. The apparatus contains an operating unit for producing a control signal in accordance with an operating action of an occupant of the aircraft and an actuation apparatus for electromotively actuating the door in accordance with the control signal. The operating unit has a sensor arrangement for detecting a gesture of the occupant as an operating action so that it is possible to operate the apparatus in a touch-free manner.

U.S. Pat. No. 4,994,722 describes a system for automatically locking a door of a washroom in an aircraft from a remote location. The system contains means for activating the system, means for detecting the presence of a person in the washroom, means for locking the unoccupied washroom and means for selectively immobilizing the system in order to allow an authorized person to access the washroom.

SUMMARY OF THE INVENTION

An object of the present invention is to propose improvements with respect to a door for a compartment in an aircraft with a locking arrangement.

The object is achieved by a door arrangement according to the independent door arrangement claim. Preferred or advantageous embodiments of the invention will be appreciated from the claims, the following description and the appended figures. The door arrangement is used for integration in an aircraft. The door arrangement contains a wall structure. The wall structure is configured to at least partially surround an aircraft compartment according to specifications. The term “according to specifications” is intended to be understood so that the wall structure is adapted to a corresponding aircraft or a specific type of aircraft, in particular geometrically/with respect to the materials and dimensions thereof, etc., so that the wall structure can ultimately form a portion of the finished aircraft.

The door arrangement contains a door which is arranged in the wall structure for the compartment. The wall structure has a wall portion which is arranged laterally beside the door. The door has at least one door leaf which can be pivoted relative to the wall portion between a closed position and an open position.

The door arrangement contains a locking arrangement for the door. The locking arrangement contains a locking apparatus which is arranged in the door leaf. The locking apparatus contains a blocking element. The blocking element is movable. It can, by being moved in a blocking direction, be moved into a blocking position, in which a movement of the door is blocked in the closed position. Therefore, the door cannot then be moved out of the closed position, in other words it is retained or locked in the closed position. By moving the blocking element counter to the blocking direction, it can be moved into a movement position, in which the movement of the door out of the closed position is possible.

The locking apparatus therefore contains a blocking element which is constructed for blocking the door movement of the door. To this end, the blocking element can be moved into a blocking position, in which the door movement is blocked, and into a movement position, in which the door movement is possible. Preferably, the door in the blocking position cannot be opened by the opening movement and cannot be closed by the closing movement. Preferably, the door can be moved in the movement position from the open position into the closed position and vice versa. For example, the blocking element is in the form of a blocking bolt or a blocking bar.

The locking arrangement contains a lock actuator which is arranged in the wall portion. The lock actuator contains a first mechanical actuation element which is particularly in the form of a first bolt. The actuation element is not connected to the blocking element and is configured to move the blocking element by mechanical application pressure from the movement position into the blocking position and/or from the blocking position into the movement position. The terms “not connected/application pressure” are intended to be understood in such a manner that no fixed or movable connection of any kind exists between the two components (actuation element, blocking element). The actuation element can produce a movement of the blocking element exclusively in that it applies pressure to the blocking element—directly or indirectly via the interposition of other mechanical elements. An application of tension to the blocking element is therefore impossible. The pressure is brought about only by a mechanical, movable abutment in the force transmission chain between the actuation element and the blocking element in the direction from the actuation element toward the blocking element.

According to the invention, the first actuation element is constructed to transmit only a pressure force to the blocking element, in particular in order to block the door movement and in order to lock the door. Furthermore, the second actuation element is constructed to transmit only a pressing force to the closure element, in particular in order to unlock the door and to release the door movement. The first actuation element therefore does not apply any tension force directly to the blocking element and the second actuation element does not apply any tension force directly to the closure element. An indirect application of tension by bypassing the other element in each case is possible, however. In particular, the closure element and the blocking element can be moved exclusively by displacement, particularly not by pulling, into the blocking and movement position or into the locking and unlocking position.

Therefore, the invention thus also relates to a locking arrangement for a door of a compartment which is intended to be locked, for example, a washroom (lavatory) or a rest area for cabin attendants and pilots (crew rest compartment) in an aircraft. The locking arrangement is constructed to lock or unlock the door and to block a door movement, in particular an opening movement and closing movement, or to release the door movement. Preferably, the compartment can be integrated in a cabin of the aircraft. The door is particularly an access door, through which the compartment can be entered.

The locking arrangement contains a locking apparatus for locking and blocking the movement of the door. The locking arrangement further contains a lock actuator. The lock actuator is constructed to actuate the locking apparatus.

The lock actuator contains a first actuation element, in particular a first bolt, and in particular also a second actuation element, in particular a second bolt. The following explanations always relate in a generalized manner and for the sake of simplicity to both actuation elements, but also apply accordingly to the case that only one actuation element is present.

The locking apparatus can be actuated by means of the actuation element(s). Preferably, both actuation elements are directed in the same direction with respect to their movability/possible movement paths, particularly also the longitudinal extent directions thereof, and therefore extend parallel with each other and are arranged, for example, in a housing of the lock actuator. In particular, both actuation elements extend in an installation situation of the locking arrangement in the compartment substantially horizontally or in a level manner, in particular in the same direction and/or parallel with a base of the compartment. The actuation elements are particularly constructed to be moved simultaneously and/or synchronously in opposite directions, in particular linearly. Preferably, the blocking element and where applicable the closure element extend horizontally and/or in a level manner, in particular in the same direction and/or parallel with the base. In particular, the door actuator and the locking apparatus are orientated horizontally and/or in a level manner, in particular in the same direction and/or parallel with the base of the compartment.

According to the invention, it is possible to operate the locking arrangement of a door, which is integrated in the door leaf, by mechanical actuation from outside the door leaf, that is to say, out of the wall portion which is adjacent in the closed position, in particular to lock or unlock it. Therefore, a corresponding mechanism in the door leaf is not necessary.

In a preferred embodiment, the locking apparatus further contains a closure element. The closure element can be moved into a locking position, in which the door is locked, by movement in a closing direction. By being moved counter to the closing direction, the closure element can be moved into an unlocking position, in which the door is unlocked. The closing direction is particularly a direction which is parallel and in the same direction or in particular parallel and in the opposite direction, that is, a counter-direction, with respect to the blocking direction.

In a preferred embodiment of the invention, therefore, the locking apparatus comprises a closure element, by which the door can be locked or unlocked. To this end, the closure element can be moved into a locking position and into an unlocking position, wherein the door is locked in the locking position and is unlocked in the unlocking position. For example, the closure element is in the form of a closure bolt or a closure bar.

The lock actuator then contains the above-mentioned second mechanical actuation element. In accordance with the first actuation element, the second actuation element is also not connected to the closure element. Furthermore, it is configured to move the closure element from the unlocking position into the locking position and/or from the locking position into the unlocking position by mechanical application pressure.

The mechanical "unconnected nature" also applies in the case of two actuation elements in particular also in a crosswise manner, that is to say, the second actuation element is not connected to the blocking element and the first actuation element is not connected to the closure element.

According to the invention, doors can also be actuated with a correspondingly additional closure element with respect to the locking apparatus thereof by the lock actuator, as already explained accordingly above with respect to the blocking element.

In a preferred embodiment, the first mechanical actuation element—or both mechanical actuation elements if a second one is present—is/are movable back and forth in the closed position of the door in the direction toward the locking apparatus. A non-connected mechanical pressure influence on the locking apparatus can be carried out mechanically in a particularly simple manner by the lock actuator by a corresponding movement direction.

In a preferred embodiment, both actuation elements are present and the first actuation element and the second actuation element are configured to be moved (in particular, exclusively) linearly and synchronously in opposite directions, in particular on parallel movement paths. Such a movement guide of the actuation elements is particularly advantageous in the door arrangement.

The second actuation element can be moved in particular synchronously and/or simultaneously with the movement of the first actuation element in a first linear direction as a result of an active connection, for example, by means of the first toothed wheel, in a second linear direction. Optionally additionally or alternatively, the second actuation element can be moved synchronously and/or simultaneously with the movement of the first actuation element in the second linear direction as a result of the active connection in the first linear direction.

One possible embodiment of the invention further makes provision for both actuation elements to be actively connected. As a result of the active connection, there is achieved in particular a forced coupling, by means of which both actuation elements can be moved exclusively simultaneously and/or synchronously in opposite directions. Preferably, both actuation elements are actively connected to each other via a first coupling means of the lock actuator, for example, via a first toothed wheel, and coupled in this manner. In particular, each of the actuation elements has an external toothing, with which the first toothed wheel can mesh. Preferably, the first toothed wheel is arranged between both actuation elements so that it can mesh with the external toothing at an upper side of one of the actuation elements and with the external toothing at a lower side of the other actuation element, wherein the lower side is particularly directed toward the base of the compartment.

In a preferred embodiment with two actuation elements, the first actuation element is movable in a linearly aligned manner with respect to the blocking direction and the second actuation element is movable in a linearly aligned manner with respect to the closing direction. In particular, a purely or exclusively linear movability of the actuation elements in linear directions is provided in order to displace the blocking element and the closure element, respectively. Such movability of the actuation elements can be achieved mechanically in a particularly simple manner, in particular for actuation elements in the form of bolts.

In one possible embodiment of the invention, the first actuation element is arranged in a linearly aligned manner with the blocking element. Preferably, the second actuation element is arranged in a linearly aligned manner with the closure element. The first actuation element and the blocking element are not connected, that is to say, not secured to each other at the end. In particular, the blocking element is arranged with one end directed in the closing direction adjacent to an end or adjoining an end, which is directed in the blocking direction, of the first actuation element. The second actuation element and the closure element are not connected, in particular not secured to each other at the end. In particular, the closure element is arranged with one end directed in the closing direction adjacent to an end or adjoining an end, which is directed in the blocking direction, of the second actuation element.

In one possible embodiment of the invention, the end, which is directed in the blocking direction, of the first actuation element and the end, which is directed in the opposite direction, of the blocking element are arranged in the movement position with spacing from each other or adjacent to each other in a gap between the door leaf and the wall portion. In an additional possible embodiment of the invention, the end, which is directed in the blocking direction, of the second actuation element and the end, which is directed in the opposite direction, of the closure element are arranged in the unlocking position with spacing from each other or adjacent to each other in the gap between the door leaf and the wall portion. Consequently, it is advantageously ensured that the door or the door leaf can be pivoted relative to the wall portion in order to open or close the door.

In one possible embodiment, the closure element and the blocking element are coupled in terms of movement so that they can be moved exclusively in a synchronous and linear manner in opposite directions. The corresponding statements in relation to the correspondingly moved closure elements apply accordingly here. As a result of the corresponding forced coupling of the blocking element and the closure element, therefore, a pressure by one of the actuation elements on the blocking element or the closure element brings about a forced movement of the other element, respectively, that is to say, the closure element or the blocking element. For a movement of the blocking element and closure element in one direction, therefore, a single actuation element is also sufficient. As a result of a corresponding forced coupling of the blocking element and closure element and two actuation elements which act on one of the blocking element and the closure element, a movement of the blocking element and closure element in the two possible movement directions thereof (in and counter to the blocking direction and closing direction) can thus be carried out simply by pressure.

In the context of the invention, therefore, it is preferable for the blocking element and the closure element to be actively connected via a coupling means, for example, via a second toothed wheel. Preferably, the blocking element and the closure element have external toothings, with which the second toothed wheel can mesh, for coupling to the second toothed wheel at the outer sides thereof directed toward each other. In particular, the closure element and the blocking element can be linearly moved synchronously and/or simultaneously in opposite directions. In particular, the blocking element can be moved linearly in the blocking direction in order to move it from the movement position into the blocking position. Preferably, the closure element can be moved linearly synchronously and/or simultaneously with respect to the movement of the blocking element (in the blocking direction) in a closing direction in order to move it from the unlocking position into the locking position.

In particular, the closure element is linearly movable counter to the closing direction in order to move it from the locking position into the unlocking position. In particular, the blocking element can be moved linearly synchronously and/or simultaneously with respect to the movement of the closure element (counter to the closing direction) counter to the blocking direction in order to move it from the blocking position into the movement position.

A preferred embodiment of the invention makes provision for the locking arrangement to contain an electrical drive device, in particular with an electric motor, which contains a rotor and a stator. The drive device is constructed in a non-self-locking manner in order to be movable by means of external forces. In particular, the electric motor is constructed to generate a torque and to transmit this torque as a linear force, in particular in accordance with a rotation direction of a rotor of the electric motor, to the first actuation element. Preferably, the first actuation element can be moved in a translational manner, in particular in a first linear direction and in the opposite direction back in a second linear direction. Preferably, the first linear direction corresponds to the blocking direction and the second linear direction corresponds to the closing direction. In order to convert the torque into the linear force and/or in order to transmit the linear force to the first actuation element in a non-self-locking manner, for example, the drive device has a spindle device, in particular in the construction as a steep-threaded spindle. For example, the spindle device is connected to the first actuation element in a form-locking and/or force-locking manner. Alternatively or optionally additionally, the drive device has a gear mechanism for converting, transmitting and/or translating the torque into the linear force.

Alternatively, it is possible in the context of the invention for the electrical drive device to comprise a linear actuator. Preferably, the linear actuator is constructed to produce a linear movement and to transmit it as the linear force to the first actuation element, in particular in order to move it translationally in the first linear direction and back in the second linear direction. The linear actuator is then also constructed in a non-self-locking manner.

In the context of the invention, there may alternatively be provision for the electric motor or the linear actuator to transmit the linear force to the second actuation element in order to move it translationally in the first linear direction and in the opposite direction in the second linear direction.

In the context of the invention, there is preferably provision for the first actuation element to be movable in the first linear direction, for example, by means of the drive device for moving, in particular for displacing the blocking element in the blocking direction. The closure element is, as a result of the active connection via the second toothed wheel preferably in the closing direction, synchronously and/or simultaneously with respect to the blocking element in the blocking direction. The second actuation element is movable in the second linear direction synchronously and/or simultaneously with respect to the movement of the first actuation element in the first linear direction, wherein the second actuation element can be displaced in the second linear direction additionally and/or simultaneously by the closure element which moves in the closing direction. In particular, the blocking element can consequently be moved into the blocking position by the movement of the first actuation element in the first linear direction and the connected application of the pressing force of the first actuation element to the blocking element, wherein the closure element can be moved into the locking position synchronously and/or simultaneously.

In the context of the invention, there is further preferably provision for the second actuation element to be movable in the first linear direction in order to move, in particular to displace the closure element in the blocking direction. To this end, the first actuation element is movable in the second linear direction particularly by reversing the rotation direction of the rotor of the electric motor, for example, by means of the drive device so that the second actuation element can be moved in the first linear direction synchronously and/or simultaneously. The blocking element is movable, preferably in the closing direction, synchronously and/or simultaneously with respect to the movement of the closure element in the blocking direction as a result of the active connection via the second toothed wheel. In particular, consequently, the closure element can be moved in the unlocking direction by the movement of the first actuation element in the second linear direction, the movement thereby generated of the second actuation element in the first linear direction and the connected application of the pressing force of the second actuation element to the closure element, wherein the blocking element can be moved into the movement position synchronously and/or simultaneously.

Optionally additionally, the locking arrangement contains an indication device having an indication element. Preferably, the indication element is constructed for outputting an indication, by means of which a user of the door can be notified, particularly from outside and/or inside the compartment, whether the door is locked or unlocked. In particular, a plurality of, for example two, indications are successively arranged on the indication element. Preferably, the indication element is coupled to the closure element and is movable together therewith so that in the locking position of the closure element it outputs the indication "Occupied" and in the unlocking position of the closure element it outputs the indication "Vacant" or "Free". For example, the door leaf has a recess, wherein the indication element is arranged behind and laterally beside the recess for movement in the blocking direction and in the opposite direction so that the correct indication can be output through the recess.

In one possible embodiment of the invention, the locking apparatus can also be actuated manually in addition to the actuation by the lock actuator. This is possible in particular as a result of the non-self-locking construction of the drive device. For manual actuation, for example, the locking apparatus has a gripping element which is arranged in a concealed manner and in particular so as to be able to be exposed for actuation on the door, in particular on an outer side directed toward the exterior of the compartment and on an opposite inner side of the door. Preferably, the gripping element is actively connected to the closure element in a direct or indirect manner. The closure element and consequently also the actively connected blocking element is thereby movable by means of the gripping element in the blocking direction and the opposite direction in order to lock the door and to block the door movement and in order to unlock the door and to release the door movement.

For example, the locking apparatus is already known or already exists and is already integrated in the door for use which was previously purely manual. It is advantageous for the existing locking apparatus to be able to be retrofitted in a simple and cost-effective manner with the lock actuator, particularly without carrying out any relatively great modification operations of the locking apparatus. Consequently, the locking apparatus can be actuated automatically, in particular electromechanically, for example, by a corresponding triggering action by the user of the door, by means of the lock actuator. In particular, a contactless door movement, door locking and door unlocking can advantageously be achieved, which can result in an increase of a hygiene standard during use of the washroom. If the lock actuator fails or in the event of a power failure, it is further advantageous for the locking apparatus also to be able to be actuated manually.

In particular, the door is in the form of a folding door or a pivoting or double-wing door. The folding door contains a plurality of, in particular two door leaves, which are pivotably connected to each other by one or more hinge devices. Alternatively, the door may be in the form of a pivoting and/or double-wing door with only one door leaf which can be pivoted relative to the wall portion.

In a preferred embodiment, therefore, the door is a folding door having an external door leaf and having an internal door leaf, wherein the external and internal door leaves are pivotably connected to each other via a hinge device. Only the external door leaf adjoins the wall portion, wherein the blocking element engages in the blocking position in the hinge device and/or wherein where applicable—that is, if present—the closure element engages in the wall portion in the locking position.

In the construction of the door as a folding door with two door leaves, the locking apparatus is therefore integrated in particular in the door leaf which adjoins the wall portion. This door leaf which adjoins the wall portion is referred to below as the external door leaf and the door leaf which is pivotably connected to the external door leaf is referred to below as the internal door leaf.

One embodiment of the invention makes provision for the blocking element to engage in the blocking position in the hinge device or in one of the hinge devices between the door leaves when the door is the folding door. Consequently, the internal door leaf can no longer be pivoted relative to the external door leaf and the folding door is blocked against movement of the door. An additional embodiment of the invention makes provision for the closure element to engage in the wall portion in the locking position. Consequently, the external door leaf of the folding door can no longer be pivoted relative to the wall portion and the folding door is locked.

In an alternative embodiment, the door is a pivoting door or double-wing door with precisely one door leaf. The door leaf adjoins the wall portion, wherein the closure element engages the locking position in the locking position in the wall portion and/or the blocking element engages in the wall portion in the blocking position.

Particularly for such a double-wing door, one blocking element is sufficient in order to retain/block the door in the closed position. A second blocking element in the form of the closure element is then particularly not present.

In the event that the door is in the form of the pivoting and/or double-wing door with the precisely one door leaf, the door leaf is therefore arranged in abutment against the wall portion. The pivoting/double-wing door does not have any hinge device which is arranged with spacing from the wall portion. In particular, the locking of the pivoting/double-wing door is carried out exclusively by the closure element and/or the blocking element. In particular, the closure element/blocking element engages in the wall portion to this end in the locking position/blocking position in order to prevent the pivoting movement of the door leaf. If only one element (blocking element or closure element) blocks the door, in particular the other element, that is to say, the blocking element/closure element, does not take up any forces in the blocking/locking position unlike the function therefor in the folding door. In particular, the closure element is not even present then but instead only the blocking element. However, there is also preferably provision in the context of the invention for the blocking element to continue to be provided and used for coupling the closure element in terms of force and movement if the door is in the form of a pivoting/double-wing door.

The object of the invention is also achieved by a control and information system according to the independent control and information system claim. This system is used for a compartment of an aircraft which therefore is and/or can be integrated in an aircraft. The compartment comprises the above-explained door.

The control and information system and at least a portion of the possible embodiments thereof and the respective advantages have already been explained accordingly in connection with the door arrangement according to the invention.

The control and information system comprises the door arrangement according to the invention. The control and information system has a control device.

The control and information system contains at least one human/machine interface. The human/machine interface is constructed to detect a triggering action of a user of the door, for example, of a passenger of the aircraft, and to transmit the triggering action as a triggering signal to the control device. In addition to the user, the triggering action can also be carried out by the crew and/or the staff of the aircraft. Preferably, the control device is constructed to control the lock actuator—and optionally the door actuator—in accordance with the triggering signal, that is to say, in the event of and/or after the transmission of the triggering signal, that is to say, on the basis of the triggering signal.

The control and information system further contains a communication interface. In the context of the invention, it is possible for the communication interface to be integrated in a display device. It is also possible for the communication interface to be received together with the display device and the sensor device in a housing—in particular of the human/machine interface. It is preferable for the communication interface to be connected to at least one external output device of an authorized location and/or the display device in technical signal and/or data terms.

The communication interface is constructed to transmit the input information items from the authorized location to the control device. For example, the staff or crew can be authorized by inputting a password in the touch screen or wirelessly, for example, by near field communication (NFC), with the display device or also via the external output device in order thus to form an "authorized location" and to be able to access the communication interface. A regular user, for example, a passenger of the passenger aircraft, of the human/machine interface does not initially constitute an authorized location because he/she has not been authorized in a particular manner. In particular, the authorized crew or the authorized staff member can transmit the input information items to the control device by means of the communication interface. Preferably, the control device controls the display device so as to display the input information items.

Therefore, the communication interface serves to transmit the input information items of an authorized location to the control device.

Alternatively or additionally, the human/machine interface is constructed to transmit output information items of the control device to the authorized location. Preferably, the human/machine interface is constructed to carry out an exchange of the input information items and the output information items between the authorized location and the control device. The exchange can be carried out, for example, mutually. In particular, a communication between the control and information system and the authorized location, particularly between the control device and the authorized location, is possible via the compartment and/or the aircraft in which the compartment is integrated. The authorized location is not the usual user of the door, that is to say, not the passenger. The authorized location is instead at least one additional entity, for example, a member of the crew or staff of the aircraft. An on-board computer of the aircraft for controlling the aircraft may also be involved. For example, the human/machine interface is arranged outside the compartment, in particular adjacent to the door.

In a preferred embodiment, the door arrangement, in particular the lock actuator, contains a first position sensor which is constructed to detect the position of the first actuation element as the first position signal. The position of the first actuation element particularly indicates whether the door movement is blocked and whether the door is locked or whether the door movement is unblocked and the door is unlocked. Alternatively or additionally, the door arrangement, in particular the lock actuator, comprises a second position sensor which is constructed to detect an absolute door position, for example, "open", "closed", "partially open", etc., as the second position signal.

The door arrangement then also comprises a door actuator for opening and closing the door, in particular for carrying out the door movement. For example, the door actuator contains a drive unit having an electric motor and a gear mechanism which is constructed to generate and transmit a torque to at least one hinge device of the door.

The control device is constructed to control the lock actuator and/or the door actuator on the basis of the first or second position signal. The control device preferably contains a housing, in which a controller, motor driver for driving electric motors of the door actuator and the lock actuator, a store, an electrical current connection to a power supply of the aircraft, discrete inputs and outputs and/or data bus interfaces of the control device are received.

It is advantageous for a compartment which is networked with the aircraft, the crew and/or the staff with a door which can be actuated in an automatic and where applicable manual manner for the user and also for the authorized location to be able to be provided by means of the control and information system.

The position sensors are connected to the control device in technical signal terms. In particular, the position, which is detected by the first position sensor of the lock actuator, of the first actuation element can be transmitted as a first position signal to the control device. Alternatively or optionally additionally, the door position which is detected by the second position sensor of the lock actuator can be transmitted as a second position signal to the control device. Preferably, the control device is constructed to control the lock actuator, in particular the drive device of the lock actuator, on the basis of the first position signal. Alternatively or optionally additionally, the control device is constructed to control the door actuator, in particular the drive device, on the basis of the second position signal. In particular, the door actuator and/or the lock actuator are supplied with electrical current during and/or after the transmission of the triggering signal depending on the position. It is advantageous for the lock actuator to be activated to lock the door and to block the door movement only when it is transmitted by the second position signal that the door is closed. Consequently, a locking and blocking of the door movement when the door is open can be prevented.

In one possible embodiment, in which a door actuator is present, this second position signal can also be made available by the door actuator.

In a preferred embodiment of the invention, the human/machine interface comprises a display device. Preferably, the display device is in the form of a monitor or display, optionally additionally with a corresponding hardware platform. For example, the display device contains a touch screen for touch-sensitive actuation. It is also possible for the display device to comprise a loudspeaker function for audio outputs.

Preferably, the display device is constructed to display the input information items of the authorized location. Preferably, the display device is constructed to display the output information items of the control device and/or to output them. Optionally additionally, the display device is constructed to display the triggering action of the user and/or actions of the user to be initiated.

The input information items may be, for example, instructions of the crew and/or staff which lead to a deactivation of the control device, in particular switching the control device to the powerless state, and which allow a manual unlocking and opening of the door. This is advantageous, for example, in an emergency, particularly if the user of the compartment is in difficulty and the door of the compartment can no longer be automatically unlocked and opened. It is also possible for the crew and/or the staff to input instructions as input information items in order to carry out necessary maintenance and/or cleaning measures in the compartment. In this case, the door can be closed and locked for a given time by the crew and/or staff in order to carry out the measures in the compartment and to prevent a passenger from entering the compartment during this time. The input information items can also be files or contents on a storage medium which are/become stored in a store of the human/machine interface by an airline, the crew and/or the staff. In particular, a content of the files or the storage medium, for example, individual displays, can be called up by the control device and can be converted or displayed on the display device.

Alternatively or optionally additionally, the input information items may be instructions, which relate to the aircraft and/or are dependent on the flight phase, of the on-board computer for controlling the aircraft. In particular, the door can be automatically closed and locked by means of the control device during taxiing, take-off, landing and/or in the event of turbulence, etc., on the basis of the instructions which relate to the aircraft and/or are dependent on the flight phase. Advantageously, using the compartment during specific flight phases can thereby be prevented and consequently the safety of the passengers on-board can be increased.

In a preferred embodiment of the invention, the communication interface is also constructed to transmit the output information items in particular from the control device to the authorized location. For example, the output information items can be displayed on the display device as symbols, text, images and/or videos. Optionally additionally, it is possible for the output information items to be output as audio outputs via the optional loudspeaker function of the display device. Preferably, the control device controls the display of the output information items on the display device.

For example, the output information items include a door status, for example, an indication of whether the door is open or closed and/or locked or unlocked. The output information items may also include actions which are intended to be initiated by a user of the door. For example, the output information items may contain a warning that the door is closed and still has to be locked or that the door is locked and first has to be unlocked in order to be opened.

The output information items may also be individual displays which are/have been stored in the store. The individual displays may be, for example, flight-dependent lettering, video sequences, words of greeting or words of farewell, pictograms and/or logos or the like.

For example, the individual displays can be controlled in a time-controlled manner by the control device for display on the display device. In the context of the invention, it is also possible for the individual displays to be displayed in specific flight phases of the aircraft.

In a particularly preferred embodiment of the invention, the human/machine interface comprises the sensor device. Preferably, the sensor device has at least one optical proximity sensor and/or a capacitive proximity sensor for detecting a contactless approach of a user. For example, the contactless approach of the user is passing by the proximity sensor or the user standing still in front of the proximity sensor. In particular, the contactless approach of the user forms the triggering action which can be transmitted as the triggering signal to the control device for controlling the door actuator and the lock actuator.

Alternatively or optionally additionally, the sensor device has a time-of-flight sensor for detecting a contactless gesture of the user. The contactless gesture of the user may be, for example, a wiping movement with the hand of the user in front of the time-of-flight sensor. In particular, the contactless gesture forms the triggering action which can be transmitted to the control device as the triggering signal for controlling the door actuator and the lock actuator.

It is advantageous for the user and optionally additionally the crew and/or the staff to be able to carry out the opening, closing, locking and unlocking of the door by the triggering action in a contactless manner. In particular, hygiene aspects and measures suitable for disabled persons can be carried out by the actuation apparatus. It is further advantageous for the display device to be able to be controlled by means of the control device in order to display the output information items, in particular the door status, on the basis of the triggering signal. Consequently, the user and optionally additionally the crew and/or staff can be kept up to date concerning the controlled actions of the door and/or informed about measures which are intended to be carried out to actuate the door.

Particularly in the event that the display device is the touch screen, the triggering action can also be carried out by the user manually, in particular by a corresponding touch-sensitive input on the touch screen. Alternatively or optionally additionally, the touch screen can also be used to input the input information items by the authorized location and to transmit them to the control device. In particular, an individual configuration of the output information items by the authorized location is possible.

In a preferred embodiment of the invention, the control and information system has a plurality of, for example, two, human/machine interfaces. Preferably, one of the human/machine interfaces is arranged at one side of the door, in particular outside the compartment, and at least one additional human/machine interface is arranged on the other side of the door, in particular inside the compartment. Consequently, it is advantageously ensured that the user can carry out the triggering action at both sides of the door. Furthermore, it can thereby be ensured that the authorized location, in particular via the communication interface, gives instructions, such as, for example, a door locking, by correspondingly inputting the input information items, and has access to the displays which are output via the display device at both sides of the door.

One possible embodiment of the invention makes provision for the human/machine interface to initiate opening, closing, locking and unlocking of the door inside the compartment depending on the situation. In one embodiment, the human/machine interface could be achieved inside the compartment by two physically decoupled units. A switch would address the door actuator while an additional switch of the human/machine interface would address the lock actuator. Thus, an intuitive operation can be carried out by the user in a preferred manner. In particular, the user can initiate either an opening operation or a locking operation inside the compartment in the closed and unlocked state of the door. The human/machine interface outside the compartment initiates opening and closing of the door depending on the situation.

One possible embodiment of the invention makes provision for the control device to comprise an evaluation device. Preferably, the evaluation device is constructed to evaluate the triggering signal. Alternatively or optionally additionally, the evaluation device is constructed to establish and evaluate operating data of the door actuator and the lock actuator. For example, the operating data comprise operating times and/or a drive torque of the door actuator and the lock actuator and/or a current consumption which is applied to operate the door actuator and the lock actuator. Preferably, on the basis of the evaluated operating data an operating state of the control and information system can be evaluated, in particular by the evaluation device. In the context of the invention, it is possible for an operationally caused wear of components of the control and information system, for example, the door actuator or the lock actuator, to be able to be identified on the basis of the operating state, and for an internal error processing to be able thereby to be controlled by the control device. In the event that the internal error processing cannot be carried out successfully, the control device is preferably constructed to switch off the corresponding components. Thus, an at least limited operation can continue to be ensured.

In a preferred embodiment of the invention, the operating state can be transmitted via the communication interface, in particular by the control device, to the authorized location. In particular, the operating state can be transmitted to the external output device in order to report emergencies, a door blockage and/or necessary maintenance operations. Alternatively or optionally additionally, the operating state can be displayed on the display device. Consequently, the authorized location and/or the user can be informed about the operating state. It is advantageous for the operating state to be able to be transmitted early to the authorized location, and immediate or timely measures which are adapted can thereby be taken.

For example, on the basis of the operating times and the operating state which is evaluated therefrom, it can be read how often the door has been actuated and the compartment has been used. In particular, it can be taken from these information items whether and when the compartment has to be cleaned and/or maintained. Using the speed of the door actuator, for example, a necessary drive torque with which the door is opened and closed can be calculated. Consequently, it can be checked whether the produced torques and speeds correspond to the safety standards. Movement profiles, on the basis of which the door actuator and/or the lock actuator can be controlled, can be implemented. Thus, a jamming protection can be carried out and injuries to the user, the crew and/or staff can be prevented.

In the context of the invention, it is also possible for a regular use time of the compartment to be stored as an input information item in the store of the control and information system, wherein the use time can be established particularly by the evaluation device, for example, using times at which the door is closed and locked from inside the compartment and unlocked and opened again from inside the compartment. Optionally, in order to establish the use time, a timer can be integrated in the evaluation device. Preferably, the timer is started when the door is locked, in particular inside the compartment, and reset when the door is unlocked and/or opened. Thus, it can preferably be ensured that the user is inside the compartment and a locking was not initiated from outside the compartment. Furthermore, when the timer is reset, it can be ensured by the opening of the door being identified that a user located in the compartment was able to leave the compartment.

Establishing that the stored use time has been exceeded can indicate an emergency in the compartment so that corresponding assistance can be initiated, in particular after notification to the authorized location. For example, the crew and/or staff can unlock and open the door by means of the control device or by manually actuating the locking apparatus, and offer help.

Using the operating state, a failure of the door actuator and/or the lock actuator, a power interruption of the control device or any other defect of components of the control and information system can preferably also be identified and communicated to the authorized location. It is advantageous for cleaning, maintenance, repair and/or assistance operations to be able to be initiated on the basis of the transmitted operating state reliably and promptly by the authorized location.

The object of the invention is also achieved by a compartment according to the independent compartment claim. The compartment is used for integration in an aircraft. The compartment contains the door arrangement according to the invention. Alternatively, the compartment contains the control and information system according to the invention which in turn contains the door arrangement according to the invention.

Preferably, the compartment can be integrated in a cabin of the aircraft. The compartment may be a toilet cubicle and/or shower cubicle, a changing room, a rest area for the crew or the like. The compartment comprises the wall structure which at least partially surrounds the compartment. The compartment has the door which is arranged in the wall structure. The door is arranged laterally beside at least one wall portion of the wall structure or between two wall portions of the wall structure.

The compartment and at least some of the possible embodiments thereof and the respective advantages have accordingly already been explained in connection with the door arrangement according to the invention or the control and information system according to the invention.

The object of the invention is also achieved by an aircraft according to the independent aircraft claim. The aircraft contains the door arrangement according to the invention. Alternatively, the aircraft contains the control and information system according to the invention. Alternatively, the aircraft contains the compartment according to the invention.

Other features which are considered as characteristic for the invention are set forth in the appended claims.

Although the invention is illustrated and described herein as embodied in a door with a lock actuator for integration in an aircraft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
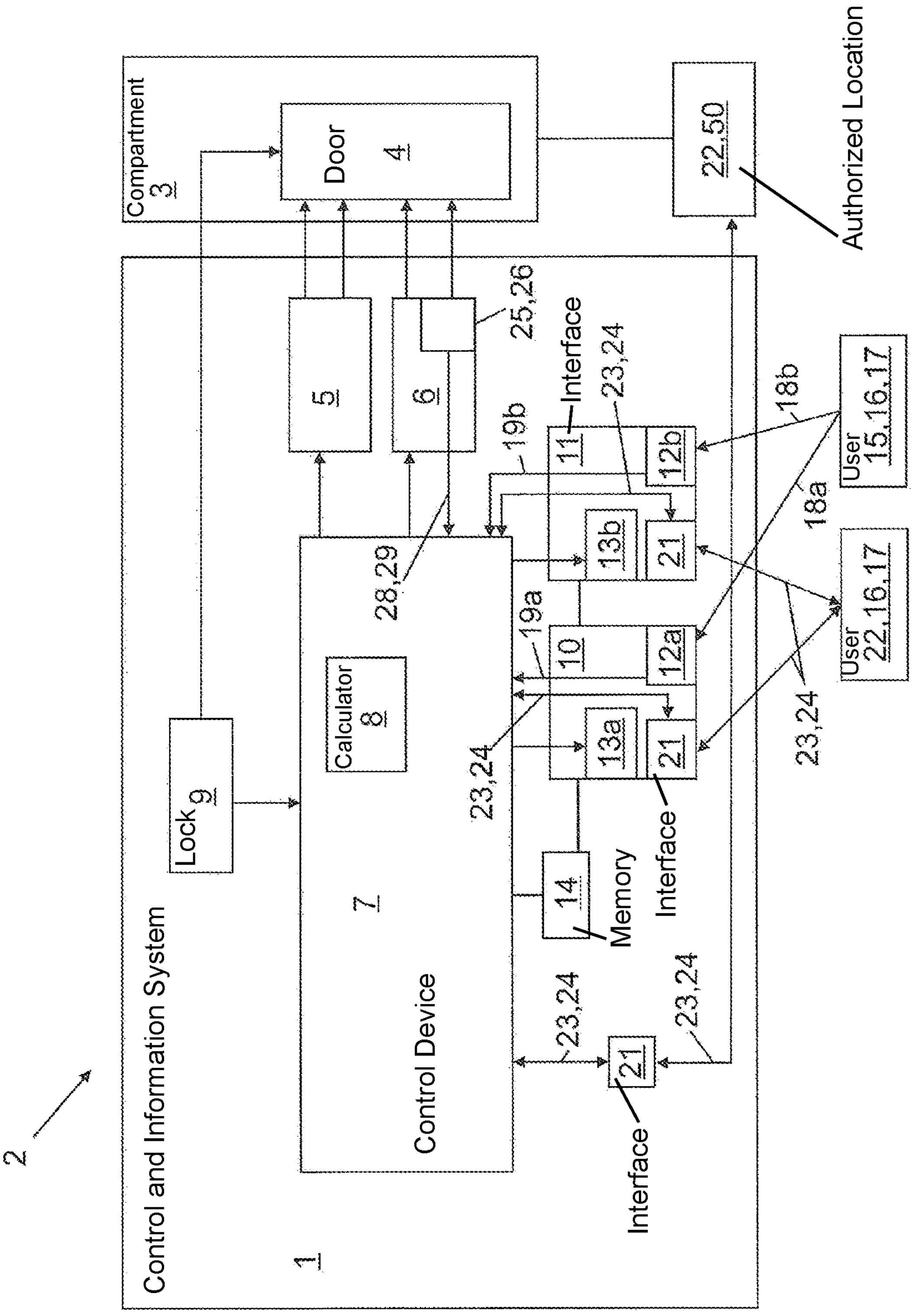
FIG. 1 is a highly schematic illustration of a control and information system inside a system architecture with an aircraft and a compartment, which is arranged in the aircraft, with a door.

Corresponding or identical parts are provided with the same reference numerals in the figures.

Referring now to the figures of the drawings in detail and first, particularly to FIG. 1 thereof, there is shown a schematic illustration of a control and information system 1 which is integrated in a system architecture. The system architecture include an aircraft 2 with an on-board computer and a compartment 3 which is in the form of a washroom, shower room or changing room for passengers and/or staff members or a rest room for the crew of the aircraft. The compartment 3 is integrated in a cabin of the aircraft 2. The compartment 3 is connected to a power supply of the aircraft 2 and connected to the aircraft 2, in particular to the on-board computer, via a data bus in technical signal terms.

Figure 4:
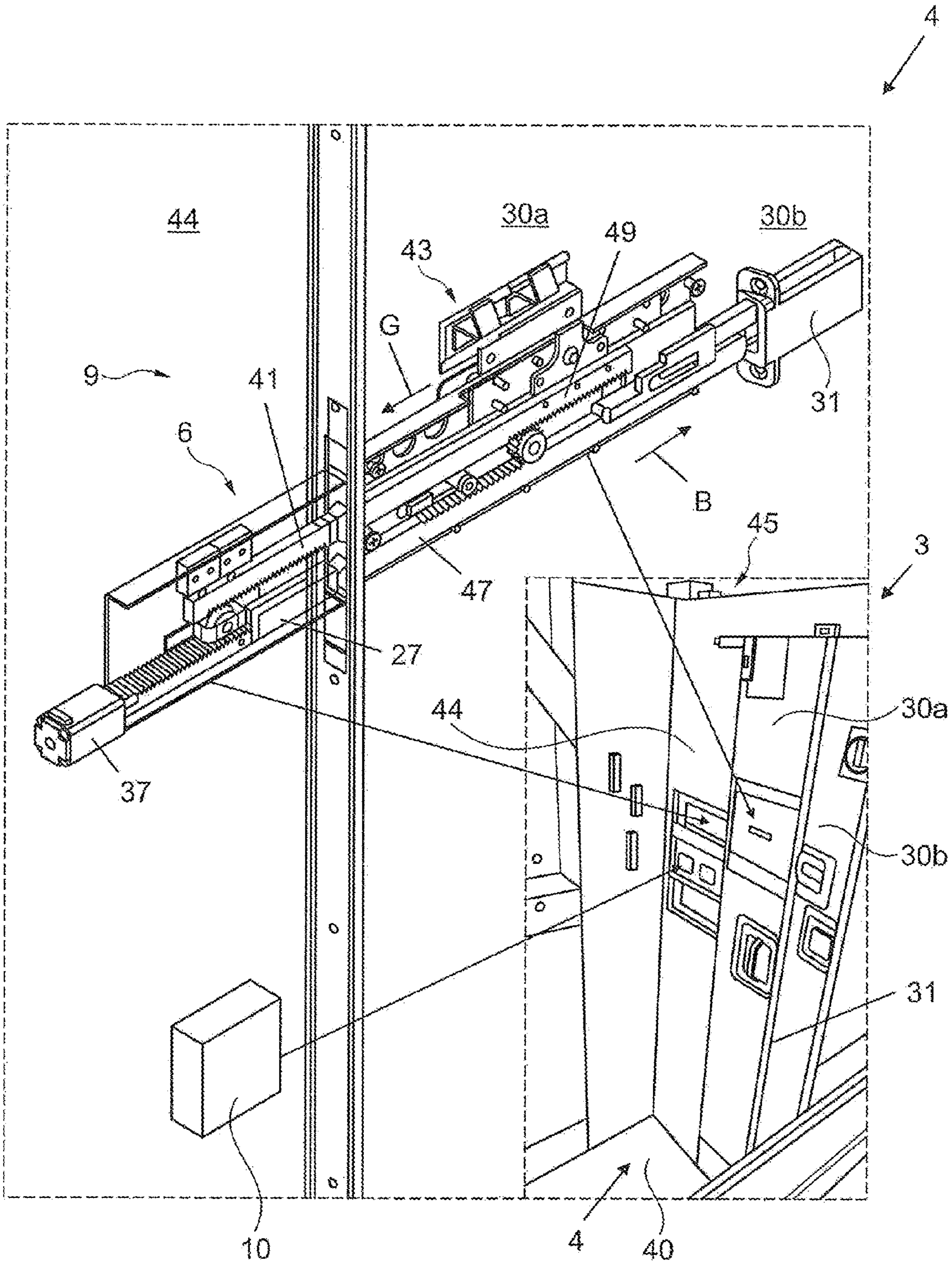
FIG. 4 is a perspective plan view of an inner side of the door, wherein an installation situation of a locking arrangement of the control and information system for locking and blocking movement of the door is shown.

According to FIG. 4, the compartment 3 has a door 4 which is arranged in a wall structure 45 which at least partially surrounds the compartment 3. The door 4 is in the form of a folding door with an external door leaf 30*a* and with an internal door leaf 30*b*. The external and internal door leaves 30*a*, 30*b* are pivotably connected to each other via at least one hinge device 31. The internal door leaf 30*b* adjoins the external door leaf 30*a* of the folding door, wherein the external door leaf 30*a* adjoins a wall portion 44 of the wall structure 45 of the compartment 3 and can be pivoted relative to it. Via the door 4, the compartment 3 can be entered and left again.

The control and information system 1 is constructed to control the door 4 and to exchange information items about the compartment 3. It contains a door actuator 5, a lock actuator 6, a control device 7 with an evaluation device 8. The control device 7 is connected to the power supply of the aircraft 2 and connected to the aircraft 2, in particular to the on-board computer, via the data bus.

The lock actuator 6 forms together with a locking apparatus 43 a component of a locking arrangement 9 which is a component of the control and information system 1 and which is shown in FIGS. 4 to 6. The locking arrangement 9 is constructed to lock and block the movement of the door 4. The lock actuator 6 is constructed to actuate the locking apparatus 43. Alternatively, the locking apparatus 43 can be manually actuated by a user 15, by a crew member 16 and/or additional staff members 17 of the aircraft 2. The additional staff members 17 are, for example, cleaning or service operators who are present in the aircraft 2 during a downtime of the aircraft 2 on the ground.

The control and information system 1 contains a first human/machine interface 10. The first human/machine interface 10 is arranged at a first side of the door 4 inside the compartment 3. The first human/machine interface 10 contains at least one first sensor device 12*a* with at least one sensor which is an optical proximity sensor or a capacitive proximity sensor or a time-of-flight sensor. The first human/machine interface 10 comprises a first display device 13*a* which is in the form of a monitor or display. The first display device 13*a* contains a touch screen, on which inputs can be carried out and on which displays and/or audio outputs can be output. The first human/machine interface 10 is connected to a store 14 and has a communication interface 21.

The control and information system 1 contains a second human/machine interface 11 which is arranged at another side of the door 4 outside the compartment 3. The second human/machine interface 11 contains at least one second sensor device 12*b* with at least one sensor which is an optical or capacitive proximity sensor or a time-of-flight sensor. The second human/machine interface 11 comprises a second display device 13*b* which is in the form of a monitor or display. The second display device 13*b* contains a touch screen, on which inputs can be carried out and on which displays and/or audio outputs can be output. The first and the second human/machine interfaces 10, 11 use the store 14 and the communication interface 21 together.

The user 15 of the door 4, the crew 16 and additional staff members 17 are present in the system structure. The crew 16, the additional staff members 17 and the on-board computer of the aircraft 2 form an authorized location 22 inside the system structure.

The user can unlock and/or open the door 4 as an incoming user 15 from outside the compartment 3 in order to enter the compartment 3. This can be carried out by manually actuating the locking apparatus 43 of the locking arrangement 9 (FIGS. 4 to 6). Alternatively, since the second human/machine interface 11 and the door actuator 5 are provided, the second sensor device 12*b* detects a triggering action 18*b* of the incoming user 15.

As a leaving user 15 who is leaving the compartment 3 through the door 4, the user 15 can unlock and open the door 4 from inside the compartment 3 in order to leave the compartment 3. To this end, the first sensor device 12*a* detects the triggering action 18*a* of the leaving user 15. The crew 16 and/or the additional staff members 17 can also carry out the triggering action 18*a*, 18*b* accordingly as humans similar to the user 15 and not in the capacity as an authorized location 22. In other words, they can use the compartment in the same manner as a "normal" user 15.

Figure 2:
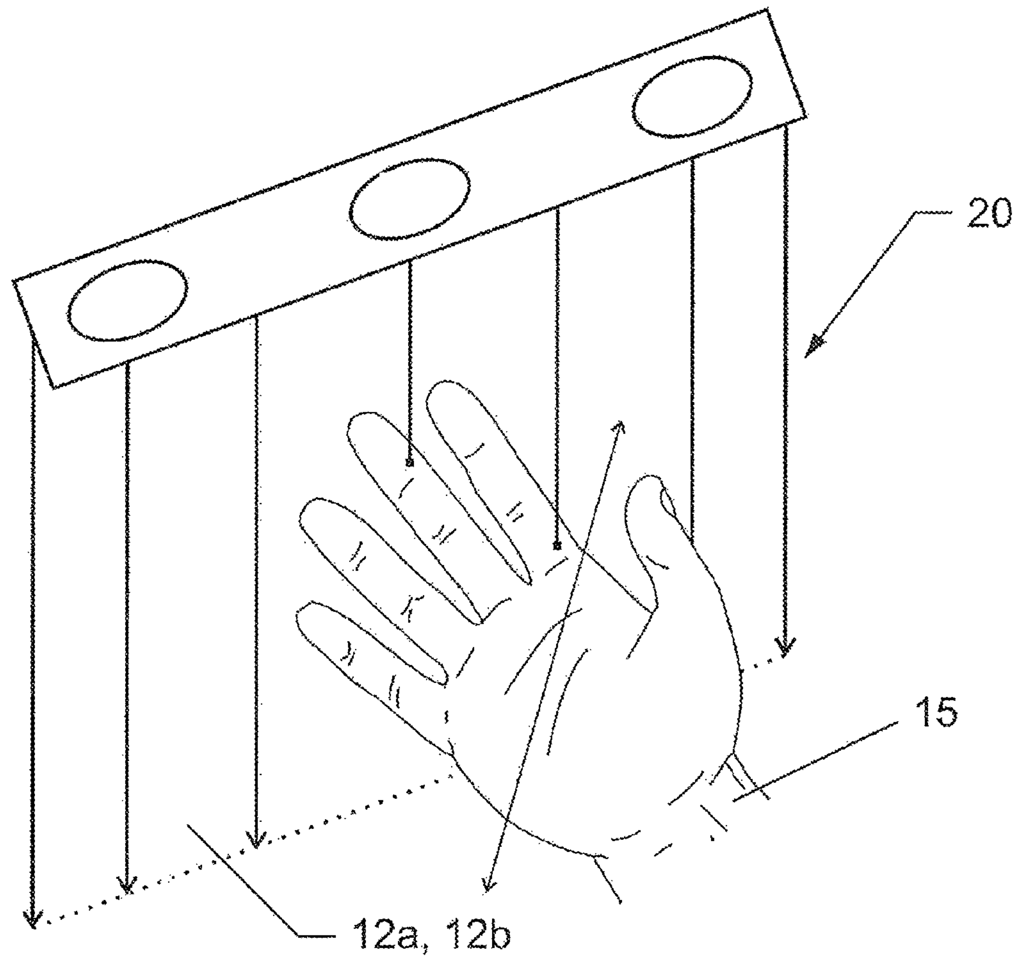
FIG. 2 is a schematic illustration of a wiping gesture with one hand in front of a sensor device of the control and information system.

The triggering action 18*a*, 18*b* is an approach by the user 15, the crew 16 and/or the additional staff members 17 toward the sensor device 12*a*, 12*b* if it comprises at least one proximity sensor. The triggering action 18*a*, 18*b* is alternatively a gesture 20 in front of the sensor device 12*a*, 12*b*. The gesture 20 may be a wiping movement with the hand by the user 15, the crew 16 and/or the additional staff members 17 in front of the time-of-flight sensor, as shown in FIG. 2. Alternatively or optionally additionally, the triggering action 18*a*, 18*b* can be carried out by a corresponding input of the user 15*a*, 15*b*, the crew 16 and/or the additional staff members 17 on the touch pad of the display device 13*a*, 13*b*.

The respective sensor device 12*a*, 12*b* transmits the triggering actions 18*a*, 18*b* as triggering signals 19*a*, 19*b* to the control device 7. The control device 7 can control the door actuator 5 on the basis of the respective triggering signal 19*a*, 19*b* in order to open the door 4. It can also control the lock actuator 6 on the basis of the triggering signal 19*a*, 19*b* in order to unlock the door 4 and to cancel a blocking of the movement of the door 4. On the basis of the respective triggering signal 19*a*, 19*b*, the control device 7 can control the door actuator 5 in order to close the door 4 and can control the lock actuator 6 in order to lock the door 4 and to block the door movement.

The lock actuator 6 contains a first position sensor 25 and a second position sensor 26 (see FIGS. 4 and 5). The first position sensor 25 detects a position of the door 4, particularly whether the door 4 is open, partially open or closed. The second position sensor 26 detects a position of a first actuation element 27, in this instance in the form of a bolt, of the lock actuator 6 (see FIGS. 5 and 6) and consequently whether the door 4 is locked and blocked in terms of the door movement or unlocked and movable.

The position of the door 4 is transmitted as a first position signal 28 and the position of the first actuation element 27 is transmitted as a second position signal 29 from the position sensor 25, 26 to the control device 7. The evaluation device 8 evaluates the first position signal 28 and the second position signal 29. The control device 7 controls the door actuator 5 during or after the transmission of the respective triggering signal 19*a*, 19*b* in accordance with the first position signal 28 in order to produce a torque for opening or closing the door 4. The control device 7 controls the lock actuator 6 during or after the transmission of the respective triggering signal 19*a*, 19*b* in accordance with the second position signal 29 in order to move the first actuation element 27 in translation in order to lock the door 4 by means of the locking apparatus 43 and to carry out the blocking of the movement of the door 4 or to unlock the door 4 and to cancel the blocking of the movement.

The control device 7 further controls the display device 13*a*, 13*b* which is relevant to the user 15, the crew 16 and/or the additional staff members 17 in order to display triggering actions 18*a*, 18*b* which are intended to be initiated. The triggering actions 18*a*, 18*b* which are intended to be initiated are particularly requests for the user 15, the crew 16 and/or the additional staff members 17 concerning measures which have to be carried out next. The control device 7 also controls the display device 13*a*, 13*b* in order to display the triggering actions 18*a*, 18*b* in particular as information items which the user 15, the crew 16 and/or the additional staff members 17 has/have already carried out. Furthermore, the control device 7 can control the display device 13*a*, 13*b* in order to display the current door status, particularly whether the door is open, closed, unlocked or locked.

The communication interface 21, by means of which information items can be transmitted between the control device 7 and the authorized location 22, is provided between the authorized location 22 which includes the on-board computer of the aircraft 2, the crew 16/the additional staff members 17—in this instance appearing as an authorized entity—the first human/machine interface 10 and the second human/machine interface 11. Input information items 23 can be communicated to the control device 7 from the authorized location 22 and/or output information items 24 can be transmitted from the control device 7 to the authorized location 22. It is also possible to have a mutual exchange of the input and output information items 23, 24.

The input information items 23 comprise instructions of the authorized location 22, in particular the crew 16, the additional staff members 17 and/or the on-board computer of the aircraft 2, by means of which access of the authorized location 22 to the control device 7 is ensured. The control device 7 can be caused by the authorized location 22 by means of the input information items 23 to control the door actuator 5 and/or the lock actuator 6 accordingly. This is carried out, for example, in accordance with flight phases, such as taxiing, take-off, landing and/or in the event of turbulence of the aircraft 2. The authorized location 22 can also transmit corresponding input information items 23 to the control device 7 in order to maintain and/or clean the compartment 3. Furthermore, the control device 7 can be deactivated by the authorized location 22 by means of the input information items 23, in particular switched to the powerless state, should this be necessary.

The authorized location 22 can input the input information items 23 via the touch screen of the display device 13*a*, 13*b* and transmit them to the control device 7. Via the touch screen and/or via the communication interface 21, the authorized location 22 can also store contents of files and/or storage media on the store 14 which can be called up by the control device 7. To this end, an authorization, for example, by entering a password, by the crew 16 and/or the additional staff members 17 may be provided. The authorization can be carried out via the touch screen or via a wireless connection, for example, near field communication, with the corresponding human/machine interface 10, 11, in particular via the communication interface 21. The control device 7 checks the authorization and enables the access of the authorized location 22, in particular the crew 16 and/or the additional staff members 17. By inputting such an authorization, therefore, the crew 16 and/or the additional staff members 17 become(s) the authorized location 22 or receives the functionality, access rights thereof, etc.

The output information items 24 can be output, in particular displayed, via the display device 13*a*, 13*b* or via the communication interface 21 to an external output device at the authorized location 22. For example, the contents of the files and/or the storage media which have been stored on the store 14 can be displayed as individual displays on the respective display device 13*a*, 13*b*.

The output information items 24 also include the implemented actions which the control device 7 has carried out as a result of the input information items 23. Thus, the output information items 24 can be output, in particular displayed, in the form of the door status and/or the actions which are intended to be initiated by the user 15.

The output information items 24 further include status messages concerning maintenance, servicing, defects and/or emergencies which are output on the respective display device 13*a*, 13*b* and/or the external output device of the authorized location 22. The status messages can be produced on the basis of an operating state of the control and information system 1. The operating state can be established in accordance with operating data of the door actuator 5 and/or the lock actuator 6 which are detected by the control device 7 and evaluated by the evaluation device 8.

The operating data can include operating times, a power consumption and/or a drive torque of the door actuator 5 and/or the lock actuator 6. The operating state can indicate, for example, on the basis of the established operating times, that the compartment has to be cleaned and/or maintained and/or that there is a defect of components of the control and information system 1. The conventional operating times of the compartment 3, which are stored in the control device 7, being exceeded can particularly indicate an emergency in the compartment 3 or a blocked door 4. As a result of the transmitted output information items 24, the authorized location 22 and also the user 15 can receive important messages and initiate corresponding measures.

Figure 3:
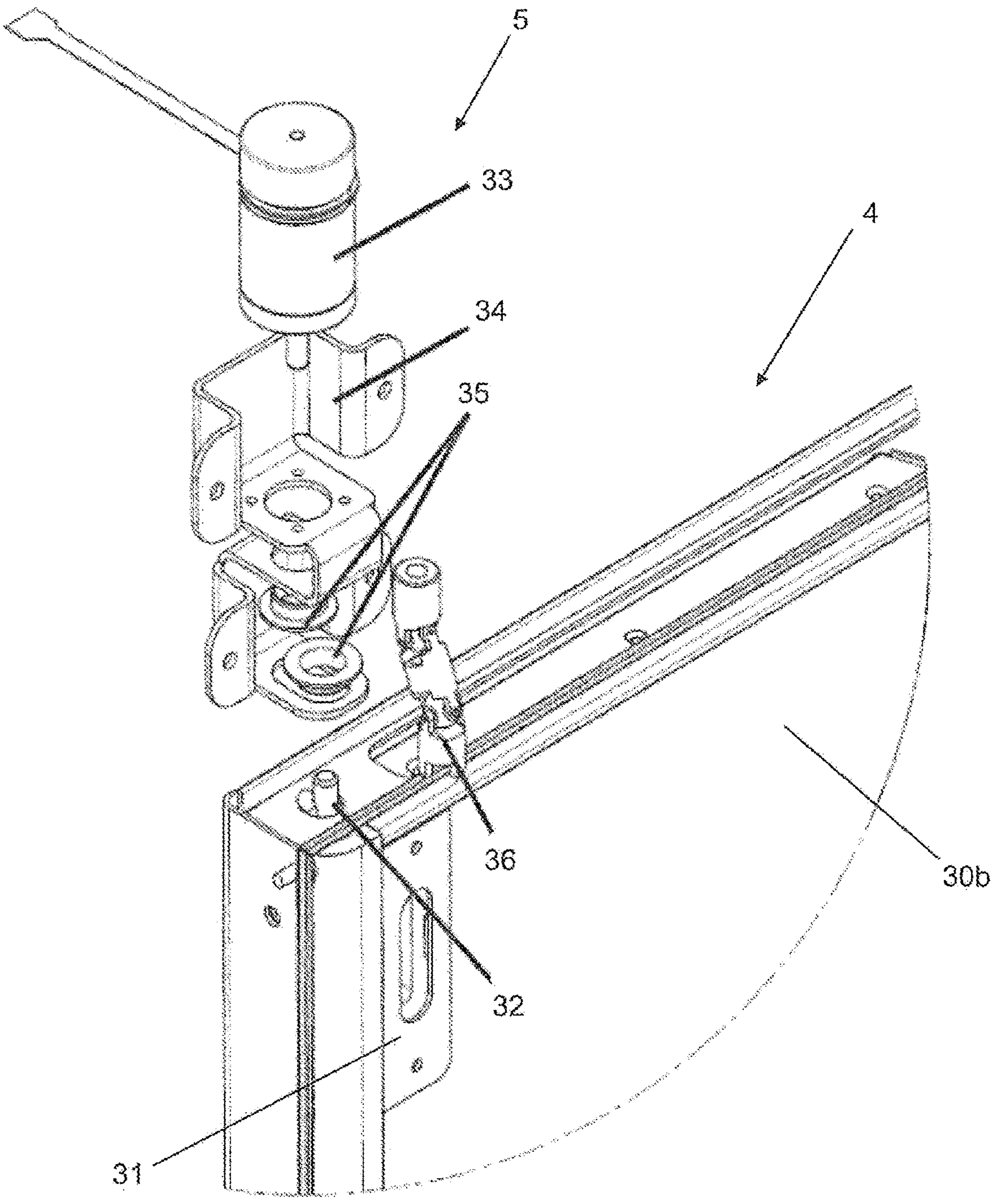
FIG. 3 is a perspective view of a door actuator of the control and information system for opening and closing the door of the compartment.

FIG. 3 shows the door actuator 5 of the control and information system 1 as an exploded illustration. The door actuator 5 is constructed to open and close the door 4. A cutout of the internal door leaf 30*b* of the door 4 which is in the form of a folding door is also shown. The hinge device 31 and a coupling 32 are fitted in the internal door leaf 30*b*.

The door actuator 5 is mechanically connected to the door 4 via the coupling 32. Alternatively, the coupling 32 may be constructed so that the door 4 is mechanically connected to the wall structure 45 of the compartment 3 via the coupling 32 and the door actuator 5 is not thereby connected to the door 4. It is also possible for the coupling 32 to be able to be released from the wall structure 45 so that the door 4 can be removed from the wall structure 45.

The door actuator 5 contains a drive unit 33 having an electric motor and a gear mechanism, a housing 34, two sliding bearings 35 and a double cardan joint 36. The electric motor of the drive unit 33 is connected to the power supply of the aircraft 2. The double cardan joint 36 is actively connected to the hinge device 31. It transmits a torque which is generated by the electric motor to the hinge device 31 so that it is actuated, the internal door leaf 30*b* is pivoted relative to the external door leaf 30*a* (FIG. 4) and the door 4 carries out an opening or closing movement. The sliding bearings 35 are constructed to absorb transverse forces during the transmission of the torque by the double cardan joint 36 and allow exclusively a pivot movement of the hinge device 31.

FIG. 4 shows a perspective plan view of an inner side of the door 4 from an interior/inner space of the compartment 3. An installation situation of the locking arrangement 9 in the door 4 and in the wall structure 45 is schematically indicated by arrows which are directed in an additional stylized view of the compartment 3 (dashed box at the bottom right).

The locking arrangement 9 contains the lock actuator 6 and the locking apparatus 43. The locking apparatus 43 can be activated/operated by the lock actuator 6. The lock actuator 6 and the locking apparatus 43 are arranged one after the other and successively. They extend in the installation situation substantially horizontally and/or levelly relative to a base 40 of the compartment 3.

The wall structure 45 at least partially surrounds the compartment 3, wherein in the wall structure 45 the door 4 is arranged as a folding door. The wall structure 45 has the wall portion 44 which is arranged in abutment with the external door leaf 30*a* of the door 4. The external door leaf 30*a* is pivotable relative to the wall portion 44. The internal door leaf 30*b* is pivotably connected to the external door leaf 30*a* via the hinge device 31.

The lock actuator 6 is integrated in the wall portion 44. The locking apparatus 43 is integrated in the external door leaf 30*a*. The first human/machine interface 10 which is arranged on the wall portion 44 in the interior of the compartment 3 is also shown.

Figure 5A:
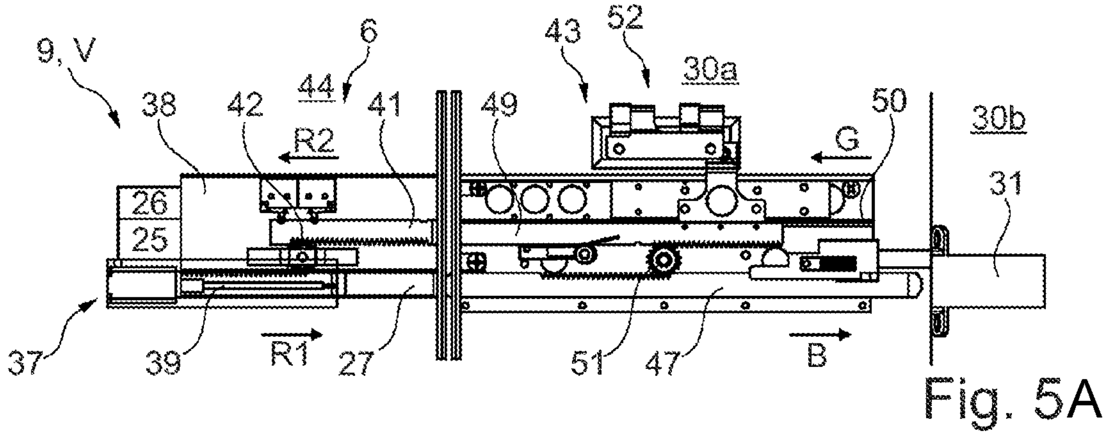
FIG. 5A is a plan view of a front side of the locking arrangement with a locking apparatus in an unlocked state and with a lock actuator.
Figure 5B:
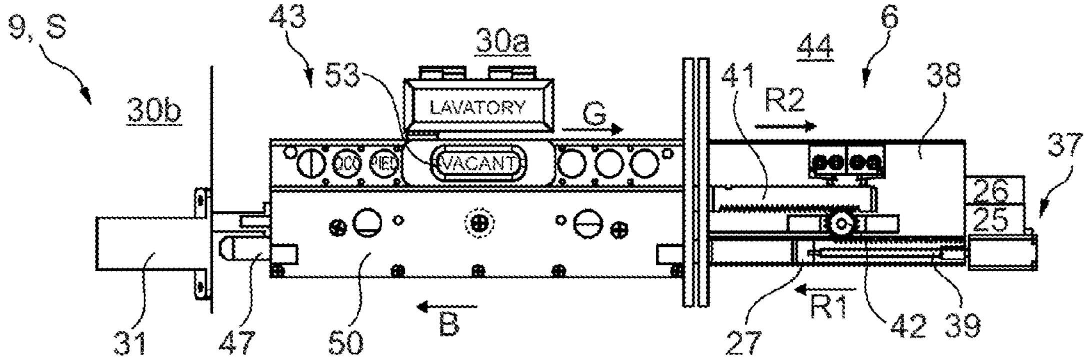
FIG. 5B is a plan view of the rear side thereof.
Figure 6A:
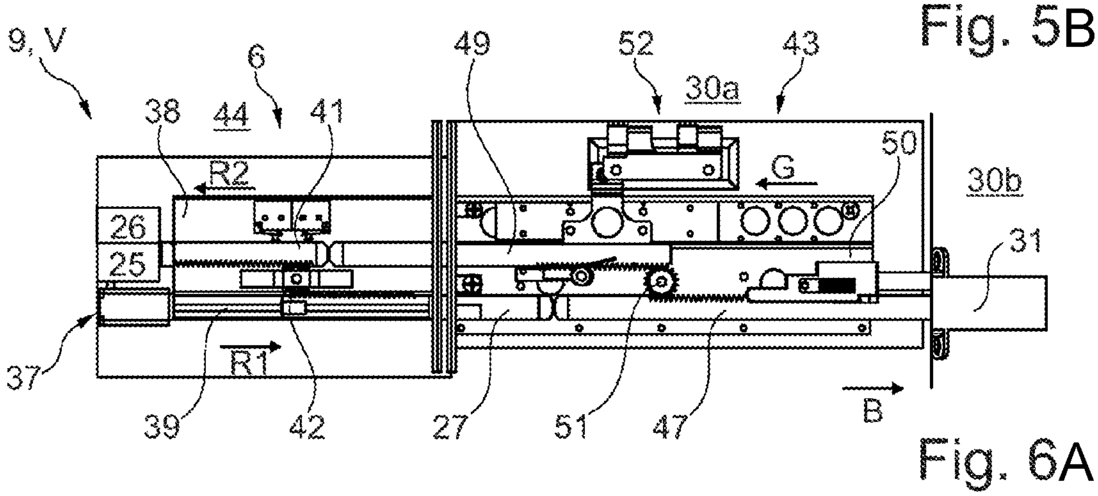
FIG. 6A is a plan view from FIG. 5A with the locking arrangement in a locked state, again in the direction toward the front side.
Figure 6B:
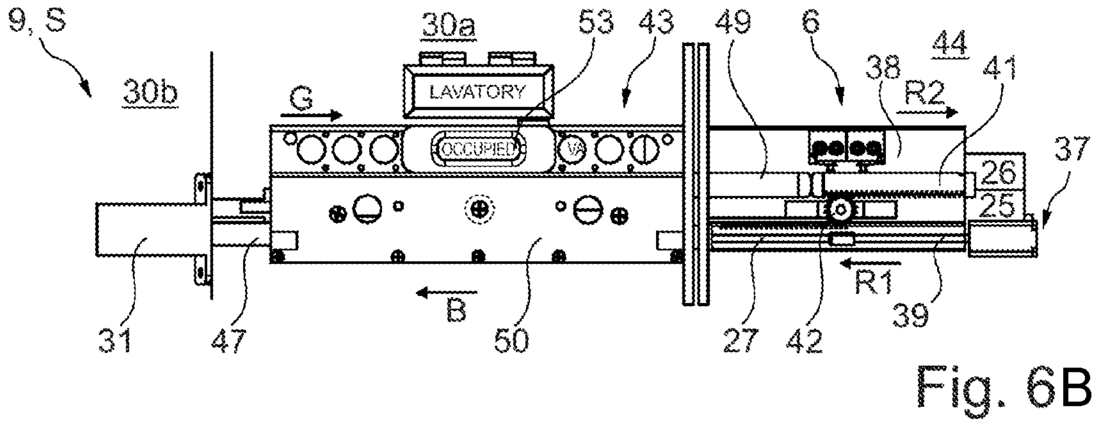
FIG. 6B is a plan view of the rear side thereof.

FIG. 5A shows a plan view of a front side V of the locking arrangement 9 and FIG. 5B shows a plan view of a rear side S of the locking arrangement 9. The locking arrangement 9 is in an unlocked state. FIGS. 6A, 6B shows the plan views of the front side V (FIG. 6A) and rear side S (FIG. 6B) of the locking arrangement 9, wherein it is in a locked state.

According to FIGS. 5A and 6B, the locking arrangement 9 extends, as described in FIG. 4, in the wall portion 44 and in the external door leaf 20*a*, wherein the door leaf 30*a* and the wall portion 44 are omitted from the drawing. The front side V is directed toward the interior of the compartment 3 and the rear side S is directed outside the compartment 3.

The locking arrangement 9 has the lock actuator 6. The lock actuator 6 comprises the first position sensor 25 which detects the absolute door position of the door 4. The lock actuator 6 transmits the door position as the first position signal 28 to the control device 7 of the control and information system 1.

The lock actuator 6 contains a housing 38, a first actuation element 27 in the form of a first bolt, a second actuation element 41 in the form of a second bolt and a first toothed wheel 42. The first actuation element 27 and the second actuation element 41 are directed in the same direction in the housing 38 (relative to the longitudinal axis or longitudinal extent direction of the bolts, directions R1, 2) and/or received parallel with each other, wherein both actuation elements 27, 41 extend substantially horizontally and/or levelly relative to the base 40. The first actuation element 27 and the second actuation element 41 are arranged or guided/supported for translational movement in the housing 38, wherein they can partially move out of the housing 38. Both actuation elements 27, 41 are actively connected by means of the first toothed wheel 42. To this end, both actuation elements 27, 41 have external toothings on the outer sides thereof which are directed toward each other and with which the first toothed wheel 42 can mesh.

The lock actuator 6 has a drive device 37 having an electric motor for generating a torque. The drive device 37 contains a spindle device 39, for example, a steep-threaded spindle, which converts the torque into a linear force and which transmits it to the first actuation element 27 in a non-self-locking manner. To this end, the spindle device 39 engages in the first actuation element 27 by being arranged in a hollow space of the first actuation element 27.

When the linear force is introduced into the first actuation element 27, it is moved in a first linear direction R1 toward the external door leaf 30*a*. As a result of the active connection via the first toothed wheel 42, the second actuation element 41 is simultaneously and synchronously moved in the opposite direction in a second opposite linear direction R2 away from the external door leaf 30*a* in the event of or during the movement of the first actuation element 27.

The locking arrangement 9 contains the locking apparatus 43. The locking apparatus 43 has an additional housing 50. It contains a blocking element 47 which is in the form of a blocking bar. The locking apparatus 43 further has a closure element 49 which is in the form of a closure bar.

The blocking element 47 and the closure element 49 are received in the additional housing 50 (relative to the longitudinal extent or movement directions B, G thereof) in the same direction and/or parallel with each other, wherein both elements 47, 49 extend substantially horizontally and/or levelly with respect to the base 40. The blocking element 47 and the closure element 49 are arranged for translational movement in the housing 50, wherein they can move partially out of the housing 50. Both elements 47, 49 are actively connected by means of a second toothed wheel 51. To this end, both elements 47, 49 have external toothings at the outer sides thereof which are directed toward each other and with which the second toothed wheel 51 can mesh.

The blocking element 47 can be moved from a movement position, which is shown in FIGS. 5A, 5B, into a blocking position which is shown in FIGS. 6A, 6B. In the blocking position according to FIGS. 6A, 6B, the blocking element 47 engages in the hinge device 31 and thereby blocks a door movement of the door 4, in particular an opening movement and a closing movement. In the movement position according to FIGS. 5A, 5B, the blocking element 47 is arranged outside the hinge device 31 in the external door leaf 30*a* so that it is possible to move the door.

In order to move the blocking element 47 into the blocking position, it can be moved in a blocking direction B. The blocking direction B corresponds to the first linear direction R1. By moving the blocking element 47 in an opposite direction to the blocking direction B, that is to say, the closing direction G, it can be moved into the movement position. The closing direction G corresponds to the second linear direction R2.

The closure element 49 can be moved from an unlocking position, which is shown in FIG. 5A, 5B and in which the door 4 is unlocked, into a locking position which is shown in FIGS. 6A, 6B and in which the door 4 is locked. In the locking position according to FIGS. 6A, 6B, the closure element 49 engages in the wall portion 44. In the unlocking position according to FIGS. 5A, 5B, the closure element 49 is arranged outside the wall portion 44 in the external door leaf 30*a*. In order to move the closure element 49 into the locking position, it can be moved in the closing direction G. By moving counter to the closing direction G (in the blocking direction B), the closure element 49 can be moved into the unlocking position.

As a result of the active connection via the second toothed wheel 51, the closure element 49 is simultaneously and/or synchronously moved in the opposite direction in the closing direction G in the event of and during the movement of the blocking element 47 in the blocking direction B, and vice versa.

The first actuation element 27 is aligned with the blocking element 47 so that an end, which is directed in the first linear direction R1, of the first actuation element 27 is arranged adjacent to/adjoining and not connected to an end, which is directed counter to the direction R1, of the blocking element 47. The two ends are arranged in the movement position of the blocking element 47 according to FIGS. 5A, 5B between the wall portion 44 and the external door leaf 30*a*. Consequently, it is possible to pivot the external door leaf 30*a* relative to the wall portion 44 in the movement position. In that the ends are not connected, the first actuation element 27 can transmit exclusively a pressing force in the direction R1 to the blocking element 47, that is to say, not a tension force counter to the direction R1.

The second actuation element 41 is aligned with the closure element 49 so that an end, which is directed counter to the direction R2, of the second actuation element 27 is arranged adjoining/adjacent to and not connected to an end, which is directed in the direction R2, of the closure element 49. The two ends are arranged in the unlocking position of the closure element 49 according to FIGS. 5A, 5B between the wall portion 44 and the external door leaf 30*a*. Consequently, it is possible to pivot the external door leaf 30*a* relative to the wall portion 44 in the movement position. In that the ends are not connected, the second actuation element 41 can transmit exclusively a pressing force to the closure element 49, that is to say, not a tension force.

The transition from the situation from FIGS. 5A, 5B (door unlocked) to the situation from FIGS. 6A, 6B (door locked) is carried out in this manner.

In the case of/during the transmission of the linear force by the spindle device 39, the first actuation element 27 is moved in the first linear direction R1. In this case, it displaces the blocking element 47 in the blocking direction B in a state not connected thereto and exclusively by applied pressure and moves it from the movement position into the blocking position. By means of the first toothed wheel 42, the second actuation element 41 is synchronously/simultaneously moved in the opposite direction to the first actuation element 27 in the second linear direction R2. By means of the second toothed wheel 51, the closure element 49 is synchronously/simultaneously moved in the opposite direction to the blocking element 47 in the closing direction G from the unlocking position into the locking position.

The transition from the situation from FIGS. 6A, 6B (door locked) to the situation from FIGS. 5A, 5B (door unlocked) is carried out in this manner.

If the rotation direction of the spindle device 39 is changed, the first actuation element 27 is moved back counter to the first linear direction R1. In this case, the second actuation element 41 is moved in the opposite direction counter to the second linear direction R2 by means of the first toothed wheel 42 so that the second actuation element 41 displaces the closure element 49 counter to the closing direction G from the locking position into the unlocking position. This is again carried out simply by pressing/abutment without any connection between the two components. By means of the second toothed wheel 51, the blocking element 47 is moved in the opposite direction counter to the blocking direction B and moved from the blocking position into the movement position.

In order to move the blocking element 47 into the blocking position and to move the closure element 49 into the locking position, a pushing force is transmitted from the first actuation element 27 to the blocking element 47. In order to move the closure element 49 into the unlocking position and to move the blocking element 47 into the movement position, a pushing force is transmitted by the second actuation element 41 to the closure element 49.

The lock actuator 6 contains the first and second position sensor 25, 26 and transmits the position of the first actuation element 27 as the first position signal 28 and the door position as the second position signal 29 to the control device 7 of the control and information system 1.

The locking apparatus 43 can be manually actuated in addition to the lock actuator 6. This is possible as a result of the non-self-locking force transmission of the drive device 37. For manual actuation, the locking apparatus 43 has a gripping element which is arranged in a concealed manner at the outer side or rear side S and at the front side V. It has the advantage that the door 4 can be unlocked and opened or closed and locked in the event of a defect of the lock actuator 6 or during a power failure. The gripping element is actively connected to the closure element 49 so that, in the case of actuation, for example, during a displacement of the gripping element, the closure element 49 can be moved in the closing direction G or in the blocking direction B and so that the blocking element 47 which is actively connected via the second toothed wheel 51 can be moved accordingly synchronously in the opposite direction.

The locking arrangement 9 contains an indication device 52. The indication device 52 has an indication element 53. The indication element 53 outputs at the outer side/rear side S and optionally additionally at the front side V through a recess in the external door leaf 30*a* an indication of whether the door 4 is locked and the compartment 3 is occupied or whether the door 4 is unlocked and the compartment 3 is free. The indication element 53 is coupled to the gripping element and/or the closure element 49 so that it is movable or displaceable together therewith and outputs the corresponding indication in accordance with the locking position or the unlocking position.

The following is a summary list of reference numerals and the corresponding structure used in the above description of the invention.

LIST OF REFERENCE NUMERALS

1 Control and information system
2 Aircraft
3 Compartment
4 Door
5 Door actuator
6 Lock actuator
7 Control device
8 Evaluation device
9 Locking arrangement
10 First human/machine interface
11 Second human/machine interface
12*a*, 12*b* Sensor devices
13*a*, 13*b* Display devices
14 Store
15 User
16 Crew
17 Additional staff members
18*a*, 18*b* Triggering action
19*a*,19*b* Triggering signal
20 Gesture
21 Communication interface
22 Authorized location
23 Input information items
24 Output information items
25 First position sensor
26 Second position sensor
27 First actuation element
28 Position signal of the first position sensor
29 Position signal of the second position sensor
30*a* External door leaf
30*b* Internal door leaf
31 Hinge device
32 Coupling
33 Drive unit of the door actuator
34 Housing of the door actuator
35 Sliding bearing for the double cardan joint
36 Double cardan joint
37 Drive device of the lock actuator
38 Housing of lock actuator
39 Spindle device
40 Base
41 Second actuation element
42 First toothed wheel
43 Locking apparatus
44 Wall portion
45 Wall structure
47 Blocking element
49 Closure element
50 Additional housing
51 Second toothed wheel
52 Indication device
53 Indication element
B Blocking direction
G Closing direction
R1 First linear direction
R2 Second linear direction
S Rear side
V Front side

The invention claimed is:

1. A door configuration for integration in an aircraft, the door configuration comprising:

a wall structure configured to at least partially surround a compartment of the aircraft and having a wall portion;

a door disposed in said wall structure for said compartment, said wall structure having said wall portion disposed laterally beside said door, said door having at least one door leaf being pivotable relative to said wall portion between a closed position and an open position of said door;

a locking configuration for said door, said locking configuration containing:

a locking apparatus disposed in said at least one door leaf and containing a blocking element configured for blocking movement of said door, said blocking element movable in a blocking direction to a blocking position, in which the movement of said door is blocked by the blocking element in the closed position, and said blocking element is movable counter to the blocking direction to a movement position, in which the movement of said door out of the closed position is possible;

a lock actuator disposed in said wall portion and having a first mechanical actuation element which is not connected to said blocking element and is configured to move said blocking element by mechanical application pressure from the movement position into the blocking position and/or from the blocking position into the movement position;

said locking apparatus further having a closure element being movable into a locking position, in which said door is locked in the closed position, by movement in a closing direction, and said closure element is movable to the closing direction into an unlocking position, in which said movement of said door out of the closed position is possible and the door is unlocked; and said lock actuator further having a second mechanical actuation element which is not connected to said closure element and which is configured to move said closure element from the locking position into the unlocking position by mechanical application pressure.

2. The door configuration according to claim 1, wherein said first mechanical actuation element is movable back and forth in the closed position of said door in a direction toward said locking apparatus.

3. The door configuration according to claim 1, wherein said first mechanical actuation element and said second mechanical actuation element are configured to be moved linearly and synchronously in opposite directions relative to each other.

4. The door configuration according to claim 1, wherein said first mechanical actuation element is movable in a linearly aligned manner with respect to the blocking direction and said second mechanical actuation element is movable in a linearly aligned manner with respect to the closing direction.

5. The door configuration according to claim 1, wherein said closure element and said blocking element are coupled, in terms of movement, so that they are moved exclusively in a synchronous and linear manner in opposite directions relative to each other.

6. The door configuration according to claim 1, wherein said locking configuration has an electrical drive device which is configured to move said blocking element.

7. The door configuration according to claim 1, wherein:

said door is a folding door; and said at least one door leaf includes an external door leaf and an internal door leaf, wherein said external door leaf and said internal door leaf are pivotably connected to each other via a hinge device, wherein only said external door leaf adjoins said wall portion, wherein said blocking element engages in the blocking position in said hinge device so as to block said door in the closed position; and said closure element in the locking position engages in said lock actuator disposed in the wall portion.

8. The door configuration according to claim 1, wherein said door is a double-wing door, wherein said at least one door leaf adjoins said wall portion, wherein said blocking element engages in said wall portion in the blocking position.

9. The door configuration according to claim 1, wherein said first mechanical actuation element and said second mechanical actuation element are movable back and forth in the closed position of said door in opposing directions.

10. The door configuration according to claim 1, wherein said locking configuration has an electrical drive device which is configured to move said blocking element and/or said closure element.

11. The door configuration according to claim 1, wherein said door is a double-wing door, wherein said at least one door leaf adjoins said wall portion, wherein said blocking element engages in said wall portion in the blocking position and/or said closure element engages in said wall portion in the locking position so as to block said door.

12. A control and information system for a compartment of an aircraft, wherein the compartment containing a door having a door configuration according to claim 1, the control and information system comprising:

at least one human/machine interface for detecting a triggering action of a user of the door and for transmitting the triggering action as a triggering signal to said control device;

said control device constructed to control the lock actuator in accordance with the triggering signal; and at least one communication interface for transmitting input information items of an authorized location which is different from the user to said control device.

13. The control and information system according to claim 12, wherein:

the door configuration contains a first position sensor for detecting a position of the first mechanical actuation element and/or a second position sensor for detecting a door position of the door; and the door configuration contains a door actuator for opening and closing the door, wherein the first position sensor and/or the second position sensor is connected to said control device in technical signal terms in order to transmit the position of the first mechanical actuation element as a first position signal and/or to transmit the door position as a second position signal, wherein said control device is constructed to control the lock actuator and/or the door actuator on a basis of the first position signal and/or the second position signal.

14. The control and information system according to claim 12, wherein said at least one human/machine interface has a display device for displaying the input information items and/or output information items and a further communication interface for transmitting the input information items to said control device, and said control device transmitting the output information items to the authorized location.

15. The control and information system according to claim 12, wherein said at least one communication interface transmits output information items of said control device to the authorized location.

16. A compartment for integration in an aircraft, the compartment comprising:

a door configuration, containing:

a wall structure configured to at least partially define the compartment and having a wall portion;

a door disposed in said wall structure for the compartment, said wall structure having said wall portion disposed laterally beside said door, said door having at least one door leaf being pivotable relative to said wall portion between a closed position and an open position of said door;

a locking configuration for said door, said locking configuration containing:

a locking apparatus disposed in said at least one door leaf and containing a blocking element configured for blocking movement of said door, said blocking element movable in a blocking direction to a blocking position, in which the movement of said door is blocked by the blocking element in the closed position, and said blocking element is movable counter to the blocking direction to a movement position, in which the movement of said door out of the closed position is possible;

a lock actuator disposed in said wall portion and containing a first mechanical actuation element which is not connected to said blocking element and is configured to move said blocking element by mechanical application pressure from the movement position into the blocking position and/or from the blocking position into the movement position;

said locking apparatus further having a closure element being movable into a locking position, in which said door is locked in the closed position, by movement in a closing direction, and said closure element is movable to the closing direction into an unlocking position, in which said movement of said door out of the closed position is possible and the door is unlocked; and said lock actuator further having a second mechanical actuation element which is not connected to said closure element and which is configured to move said closure element from the locking position into the unlocking position by mechanical application pressure; and a control and information system, containing:

a control device;

at least one human/machine interface for detecting a triggering action of a user of said door and for transmitting the triggering action as a triggering signal to said control device;

said control device is constructed to control said lock actuator in accordance with the triggering signal; and at least one communication interface for transmitting input information items of an authorized location which is different from the user to said control device.

17. The door configuration according to claim 16, wherein:

said door is a folding door; and said at least one door leaf includes an external door leaf and an internal door leaf, wherein said external door leaf and said internal door leaf are pivotably connected to each other via a hinge device, wherein only said external door leaf adjoins said wall portion, wherein said blocking element engages in the blocking position in said hinge device so as to block said door in said closed position and wherein said closure element engages in said wall portion in the locking position so as to lock said door in the closed position.

18. An aircraft, comprising:

a door configuration, containing:

a wall structure configured to at least partially define a compartment and having a wall portion;

a door disposed in said wall structure for the compartment, said wall structure having said wall portion disposed laterally beside said door, said door having at least one door leaf being pivotable relative to said wall portion between a closed position and an open position of said door;

a locking configuration for said door, said locking configuration containing:

a locking apparatus disposed in said at least one door leaf and containing a blocking element configured for blocking movement of said door, said blocking element movable in a blocking direction to a blocking position, in which the movement of said door is blocked by the blocking element in the closed position, and said blocking element is movable counter to the blocking direction to a movement position, in which the movement of said door out of the closed position is possible;

a lock actuator disposed in said wall portion and containing a first mechanical actuation element which is not connected to said blocking element and is configured to move said blocking element by mechanical application pressure from the movement position into the blocking position and/or from the blocking position into the movement position;

said locking apparatus further having a closure element being movable into a locking position, in which said door is locked in the closed position, by movement in a closing direction, and said closure element is movable to the closing direction into an unlocking position, in which said movement of said door out of the closed position is possible and the door is unlocked; and said lock actuator further having a second mechanical actuation element which is not connected to said closure element and which is configured to move said closure element from the locking position into the unlocking position by mechanical application pressure; and a control and information system, containing:

a control device;

at least one human/machine interface for detecting a triggering action of a user of said door and for transmitting the triggering action as a triggering signal to said control device;

said control device is constructed to control said lock actuator in accordance with the triggering signal; and at least one communication interface for transmitting input information items of an authorized location which is different from the user to said control device.

* * * * *